S. NICOLSON.
Railroad Signal.
No. 2,145.
Patented June 26, 1841.
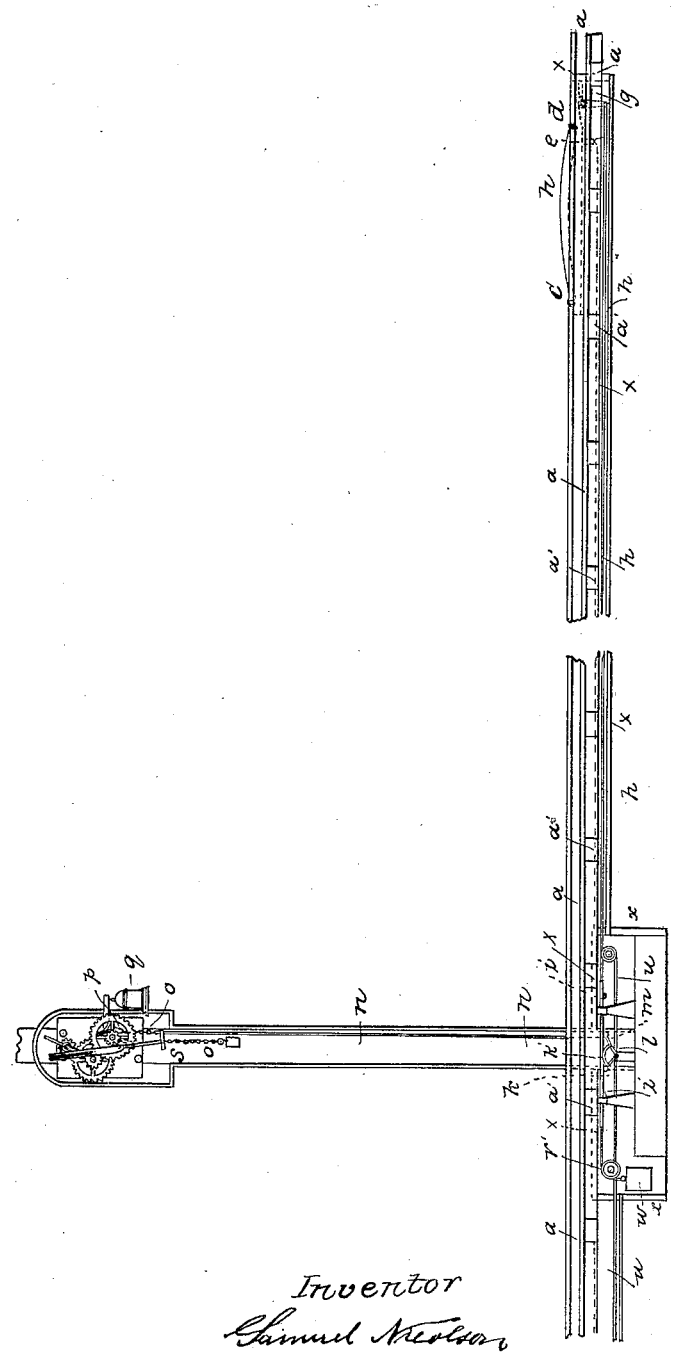
Inventor
Samuel Nicolson

UNITED STATES PATENT OFFICE.

SAMUEL NICOLSON, OF BOSTON, MASSACHUSETTS.

RAILROAD ALARM-SIGNAL.

Specification forming part of Letters Patent No. 2,145, dated June 26, 1841; Reissued July 3, 1847, No. 97.

*To all whom it may concern:*

Be it known that I, SAMUEL NICOLSON, of Boston, in the county of Suffolk and Commonwealth of Massachusetts, gentleman, have invented a new and useful machine called "Nicolson's Railroad Alarm-Signal," of which the following is a full and exact description, reference being had to the plates hereto annexed as a part thereof.

A wheel about eighteen inches in diameter is fixed on the outside of an engine, car, or tender, so as to project about six inches outside of the railroad track; this wheel turns on its axle. At a point about eighty rods, or any other required distance from the place where the alarm is to be sounded, parallel with the rail of the railroad as shown in Plate 1, is fixed the curved bar or lever $b$ having its axis fixed at $c$. The other end of the lever or bar $b$ is fastened to a small turning bolt or joint $e$ and by that connected with the upper end of a crank $f$. The arms of this crank are about six inches in length and are at right angles to each other, the upper arm being horizontal and the lower arm $g$ being perpendicular. To the lower end of the lower arm $g$ is fixed a wire chain or cord (of such length and size as convenience may require) which is extended toward a hollow post erected where the alarm is to be sounded and in the Plate 1 marked Figure 1. The extended chain is fastened to the end of the horizontal sliding bar $i$. This bar is about four feet long and is supported by two standards, and it has fixed to its side a hook or catch $k$. To the other end of the bar $i$ is fixed a chain or cord, which being passed over a pulley or circular lever $r'$ sustains the weight $w$. A circular lever or triangular crank $l$ is firmly fixed near the foot and at the side of the post so that its rim will be directly under the hook $k$. The arm $m$ of this crank is longer than the other; from its end a chain $n$ $n$ $o$ $o$ is conveyed upward and over the toothed groove of a cylinder $p$ and led downward upon the other side where it sustains a weight $r$ of about nine pounds. The cylinder $p$ is contained in a frame of about six inches square. The cylinder is one inch in diameter. There is fixed to it a ratchet wheel of two inches diameter and these turn on an axle fitted in the side plates of the frame. On the same axle and next to the ratchet wheel is a cog wheel with a pawl and spring to prevent the recoil of the cylinder. This cog wheel is four inches in diameter and it drives another cog wheel of two inches in diameter which is fixed upon the axle of and turns another cog wheel of four inches in diameter and this latter drives another cog wheel of three quarters of an inch diameter. The axle of this last cog wheel projects through the side of the frame and has fixed on its projecting end a crank whose arms are about one inch in length. This crank plays in a fork or slit which is in the upper end of a pendulum which is hung upon a point about three inches below the axle of the crank. The lower end of the pendulum is a hammer S and attached to the post within the reach of the hammer is a bell $q$.

When the engine, tender or car to which the wheel first above mentioned is affixed passes over the track the wheel depresses the ends $d$ of the bar or lever $b$. The arm $g$ of the crank $f$, is forced backward so as to pull the chain or cord $p$. This draws back the sliding bar $i$ and the catch or hook $k$ so as to turn the circular lever $l$ and depress its arm. By this the chain $n$, $n$, $o$ $o$, is drawn upon and the weight $v$ is raised about four inches and until the catch $k$ slips from the lever or crank $l$, then the weight $v$, falls and rings the bell $q$, by turning the cog wheels or clock work described above.

When the engine, &c., passes from the bar or lever $b$, the weight $w$ replaces the different parts of the machinery so that the levers fall to their original position and the catch $k$ falls and fastens on the lever $l$.

I claim as my invention and desire to secure by Letters Patent—

The method of communicating motion to the alarm by the passing of the wheels of the tender &c. over the curved lever $b$ connected with the alarm in the manner specified.

In testimony whereof I have hereto set my hand this eighth day of May eighteen hundred and forty one.

SAMUEL NICOLSON.

Witnesses:
 EDWARD G. LORING,
 GEO. S. CUSTIS.